United States Patent [11] 3,576,050

| [72] | Inventor | Charles R. Thomas<br>Albany, Oreg. |
|---|---|---|
| [21] | Appl. No. | 761,472 |
| [22] | Filed | Sept. 23, 1968 |
| [45] | Patented | Apr. 27, 1971 |
| [73] | Assignee | the United States of America as represented by the United States Atomic Energy Commission |

[54] APPARATUS FOR MAKING PRESSED POWDER SLEEVES
1 Claim, 2 Drawing Figs.

[52] U.S. Cl. .................................................. 18/42,
18/5, 249/177
[51] Int. Cl. ..................................................... B29c 3/00
[50] Field of Search ............................................ 18/5 (I),
(Vac. Mold Digest), 42 (M); 249/63, 177

[56] References Cited
UNITED STATES PATENTS

| 1,833,502 | 11/1931 | Strunk.......................... | 249/177 |
| 2,746,402 | 5/1956 | Baxter.......................... | 249/63 |
| 2,968,855 | 1/1961 | Stolz............................. | 249/177X |
| 3,038,199 | 6/1962 | Bartow et al................. | 18/5 |
| 3,506,235 | 4/1970 | Katz et al..................... | 249/177X |

OTHER REFERENCES
Progress in Powder Metallurgy, " Isostatic Pressing of Powdered Materials," Harry C. Jackson, Vol. 20, 1964, pp. 159— 167.

*Primary Examiner*—J. Spencer Overholser
*Assistant Examiner*—John E. Roethel
*Attorney*—Roland A. Anderson

ABSTRACT: An apparatus for preparing pressed powder sleeves by means of a centering device which positions a mandrel centrally within a sleeve mold lined with a flexible bag.

PATENTED APR 27 1971

3,576,050

INVENTOR.
CHARLES RICHARD THOMAS

BY

*[signature]*

ATTORNEY

APPARATUS FOR MAKING PRESSED POWDER SLEEVES

FIELD OF THE INVENTION

The invention is useful in the fields of powder metallurgy and powder ceramics for making sleeves of uniform wall thickness.

PRIOR ART

In the prior art, sleeves for tubing have been made by extrusion or drawing of arc-melted or sintered powder materials or pressing of powders into cylindrical shapes. Another method is drilling out the center of a solid rod. All such methods are expensive because many steps are involved and expensive equipment is required. The present invention provides a simple apparatus for achieving the desired end. In addition, the present invention has the advantages of providing sleeves of uniform wall thickness, with composition and grain structure more uniformly maintained, with very low loss of material that cannot be reused.

SUMMARY OF THE INVENTION

The present invention, an inexpensive apparatus for fabricating pressed powder sleeves, is best understood by first referring to the drawings.

DESCRIPTION OF THE DRAWINGS

In FIG. 1, 11 is a vacuum chamber, having an outlet at 12. A sleeve mold 13 is contained in the vacuum chamber, and is lined by a flexible bag 14. There is open communication between the vacuum chamber and the sleeve mold by means of apertures such as shown at 24. Powdered metal (or ceramic) is shown at 15, and 16 is a steel mandrel. Seventeen is an open sided, metal centering cap, and 18 is a rubbery centering ring. Nineteen is a rubbery plug, and 20 is a rubber gasket. A threaded rod is shown at 21 and lock nuts at 22.

PREFERRED EMBODIMENT

Figure 2:
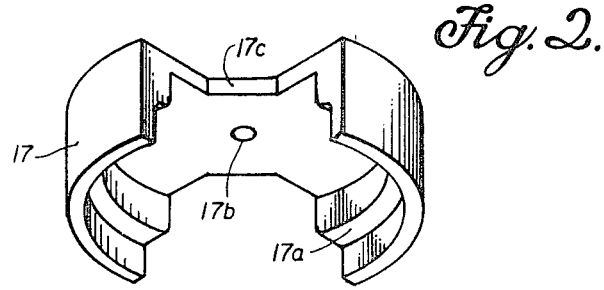
FIG. 2 is an isometric drawing of the metal centering caps labeled 17 in FIG. 1.
Figure 1:
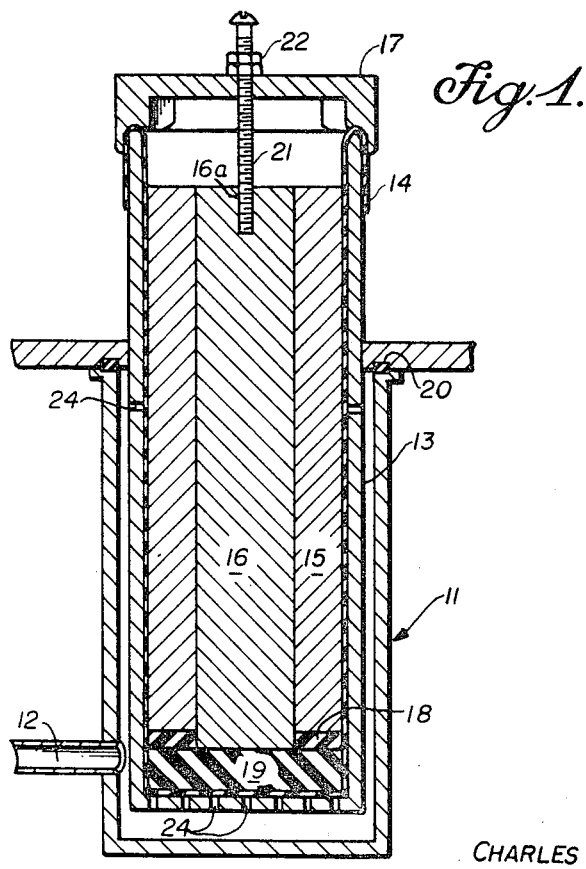
FIG. 1 shows a cross section of the apparatus.

The present apparatus is particularly suited for use while in the process of loading powders by vibration, a process well known in the art. The flexible bag 14, which may be of plastic or rubber for example, is first pulled down over the top end in a cuff on the outside of the sleeve mold 13 at such a distance as to allow enough material for tying off the bag for pressing. The remaining part of the flexible bag will fill the inside of the sleeve mold when vacuum is applied in the chamber 11. When a vacuum has been applied to draw the bag down in and against the sides of the mold, the mandrel 16 is centered in the bottom of the mold by a ¼-inch thick rubbery ring or diaphragm 18 with a hole through the center to fit the bottom end of the mandrel. At this point, the recess 17a of centering cap 17 is fitted on the top of the mold over the stretched bag. The threaded rod 21 is then turned down through the aperture 17b in the center of the centering cap and engaged with a threaded aperture 16a in the top of the mandrel for about one-half inch. Lock nuts 22 are then tightened on the threaded rod on the top of the centering cap. Loading is then ready to proceed through either open side 17c of centering cap 17, while vibration is in progress.

When loading is complete, the lock nuts are loosened and the threaded rod is removed from the top of the mandrel, and the centering cap is removed. The mandrel is left imbedded in the powder, and a ¼-inch Allen set screw is put in the top of the mandrel to keep the threads free of powder. The entire top part of the mold is sealed with a rubber plug that fits inside of the mold. The flexible bag is brought up from the outside of the mold, over the rubber plug, and tied for isostatic pressing. When the pressing is completed, the mandrel, rubber plug, and bag are removed. This results in a pressed powder sleeve of nominal wall thickness.

I claim:

1. Apparatus for preparing pressed powder sleeves, comprising:

a vacuum chamber having an opening at an end thereof and an evacuation outlet;

a sleeve mold disposed in said vacuum chamber and having an annular wall, an open end, and a closed end, the open end projecting from said chamber, through and occluding said opening, and the closed end being disposed in said chamber, said annular wall and said closed end having apertures therethrough communicating with the interior of said chamber;

a flexible bag lining the sleeve mold and extending in a cuff over and about the open end thereof;

a rubbery plug within said bag, in proximity to and overlying the closed end of said sleeve mold;

a centrally apertured rubbery centering ring positioned centrally within said sleeve mold, overlying and in juxtaposition to said rubbery plug;

a mandrel positioned centrally within said sleeve mold, one end of said mandrel being positioned in the aperture in said rubbery centering ring and the opposite end having a threaded aperture therein and being disposed in proximity to the open end of said sleeve mold;

an open-sided centering cap having a recess therein fitting over the open end of said sleeve mold and the cuff of said flexible bag, said centering cap having an aperture centrally therethrough; and a threaded rod extending through the aperture in the centering cap and into the aperture in said mandrel, whereby said mandrel is supported in position within said sleeve mold.